(12) United States Patent
Tanaka et al.

(10) Patent No.: US 6,183,913 B1
(45) Date of Patent: Feb. 6, 2001

(54) ALKALINE BATTERY SEPARATOR AND PROCESS FOR PRODUCING THE SAME

(75) Inventors: Masanao Tanaka; Koji Kimura; Nobutoshi Tokutake, all of Ibaraki (JP)

(73) Assignee: Japan Vilene Company, Ltd., Tokyo (JP)

(*) Notice: Under 35 U.S.C. 154(b), the term of this patent shall be extended for 0 days.

(21) Appl. No.: 08/937,838

(22) Filed: Sep. 25, 1997

(30) Foreign Application Priority Data

Sep. 27, 1996 (JP) .................................................. 8-277457
May 13, 1997 (JP) .................................................. 9-139355
May 13, 1997 (JP) .................................................. 9-139356

(51) Int. Cl.[7] .................................................. H01M 2/16
(52) U.S. Cl. .................................................. 429/254; 429/249
(58) Field of Search ................................. 429/254, 250, 429/249; 29/623.1

(56) References Cited

U.S. PATENT DOCUMENTS 5,290,645 * 3/1994 Tanaka et al. .................. 429/144
5,609,976   3/1997 Ueda et al. .................... 429/254

FOREIGN PATENT DOCUMENTS 7-029561  1/1995 (JP) .
8-138645  5/1996 (JP) .

OTHER PUBLICATIONS

Patent Abstracts of Japan, vol. 096, No. 009, Sep. 30, 1996 & JP 08 138645 A (Daiwabo Co Ltd), May 31, 1996.
Patent Abstracts of Japan, vol. 095, No. 004, May 31, 1995 & JP 07 029561 A (Daiwabo Co Ltd), Jan. 31, 1995.
Patent Abstracts of Japan, vol. 096, No. 011, Nov. 29, 1996 & JP 08 185848 A (Asahi Chem Ino Co Ltd), Jul. 16, 1996.

* cited by examiner

Primary Examiner—Stephen Kalafut
Assistant Examiner—Jonathan Crepeau
(74) Attorney, Agent, or Firm—Burgess, Ryan & Wayne; Milton J. Wayne; William R. Moran

(57) ABSTRACT

An alkaline battery separator comprising a hydrophilic nonwoven fabric obtainable by heat-fusing and hydro-entangling (1) polyolefin dividable composite fibers having an average fiber length of 20 to 60 mm, (2) high-strength fibers having an average fiber length of 30 to 60 mm and a fiber strength of 5 g/denier or more, and (3) polyolefin heat-sensitive-adhesive fibers having an average fiber length of 30 to 60 mm, to obtain a heat-fused and hydro-entangled nonwoven fabric by a dry-laid method, and imparting a hydrophilic property to the resulting heat-fused and hydro-entangled nonwoven fabric; these high-strength fibers accounting for 20 to 45 mass % with respect to a total mass of the polyolefin dividable composite fibers, the high-strength fibers and the polyolefin heat-sensitive-adhesive fibers. The alkaline battery separator exhibits an excellent breaking strength, and has practical and sufficient tensile strength and electrolyte-holding capacity properties.

15 Claims, 2 Drawing Sheets

ALKALINE BATTERY SEPARATOR AND PROCESS FOR PRODUCING THE SAME

BACKGROUND OF THE INVENTION

1. Field of the Invention

The present invention relates to an alkaline battery separator, i.e., a separator for an alkaline battery, and a process for producing the same.

2. Description of the Related Art

An alkaline battery separator composed of a hydro-entangled nonwoven fabric containing fine fibers derived from dividable composite fibers has many fine voids formed between the fine fibers, and accordingly has an excellent electrolyte-holding capacity.

For example, Japanese Unexamined Patent Publication (Kokai) No. 7-147154 discloses an alkaline battery separator prepared by imparting a hydrophilic property to a hydro-entangled nonwoven fabric composed of polyolefin fibers, which are mainly fine fibers, derived from polyolefin dividable composite fibers, and an alkaline battery separator prepared by adhering the hydro-entangled nonwoven fabric with polyolefin heat-sensitive-adhesive fibers having a lower melting point. The alkaline battery separators composed of mainly fine fibers derived from the dividable composite fibers have an excellent electrolyte-holding capacity. Further, the alkaline battery separator adhered with the polyolefin heat-sensitive-adhesive fibers has an excellent tensile strength.

Nevertheless, the breaking strength of the alkaline battery separators disclosed in Japanese Unexamined Patent Publication (Kokai) No. 7-147154 is insufficient. For example, when the alkaline battery separators are rolled together with electrode plates upon assembling an alkaline battery, the separators are easily broken by the edges of the electrode plates. The separators also have the disadvantages of a low yield and an inconsistent battery performance.

Further, Japanese Unexamined Patent Publication (Kokai) No. 7-29561 discloses an alkaline battery separator composed of wet-laid hydro-entangled nonwoven fabric prepared by hydro-entangling (1) 60 to 80% by weight of dividable composite fibers (fiber length=5–15 mm) consisting of polyolefin polymer and ethylene vinyl alcohol polymer, (2) 20 to 30% by weight of heat-sensitive-adhesive fibers, and (3) 10–20% by weight of synthetic fibers (fiber length=5–15 mm) having a denier larger than those of fine fibers derived from the dividable composite fibers and the heat-sensitive-adhesive fibers. The alkaline battery separator has an excellent electrolyte-holding capacity and tensile strength, but the hydrophilic nature of the alkaline battery separator is imparted only by the dividable composite fibers. Therefore, it is necessary to raise the ratio of the dividable composite fibers, and thus, the ratio of the synthetic fibers having a denier larger than those of the fine fibers and heat-sensitive-adhesive fibers is lower. As a result, some alkaline battery separators have an insufficient breaking strength.

SUMMARY OF THE INVENTION

Accordingly, the object of the present invention is to provide an alkaline battery separator having an excellent breaking strength, as well as practically sufficient tensile strength and electrolyte-holding capacity properties.

Other objects and advantages will be apparent from the following description.

In accordance with the present invention, there is provided an alkaline battery separator comprising a hydrophilic nonwoven fabric obtainable by heat-fusing and hydro-entangling (1) polyolefin dividable composite fibers having an average fiber length of 20 to 60 mm, (2) high-strength fibers having an average fiber length of 30 to 60 mm and a fiber strength (tensile strength of fiber) of 5 g/denier or more, and (3) polyolefin heat-sensitive-adhesive fibers having an average fiber length of 30 to 60 mm, the polyolefin heat-sensitive-adhesive fiber containing a polyolefin adhesive portion having a melting point lower than a melting point of the polyolefin dividable composite fiber and lower than a melting point of the high-strength fiber, to obtain a heat-fused and hydro-entangled nonwoven fabric, and imparting a hydrophilic property to the resulting heat-fused and hydro-entangled nonwoven fabric; the high-strength fibers accounting for 20 to 45 mass % with respect to a total mass of the polyolefin dividable composite fibers, the high-strength fibers and the polyolefin heat-sensitive-adhesive fibers.

Further, in accordance with the present invention, there is provided a process for producing an alkaline battery separator comprising the steps of:

substantially uniformly admixing (1) polyolefin dividable composite fibers having an average fiber length of 20 to 60 mm, (2) high-strength fibers having an average fiber length of 30 to 60 mm and a fiber strength of 5 g/denier or more, and (3) polyolefin heat-sensitive-adhesive fibers having an average fiber length of 30 to 60 mm, the polyolefin heat-sensitive-adhesive fiber containing a polyolefin adhesive portion having a melting point lower than a melting point of the polyolefin dividable composite fiber and lower than a melting point of the high-strength fiber, to form a fiber web, the high-strength fibers accounting for 20 to 45 mass % with respect to a total mass of the polyolefin dividable composite fibers, the high-strength fibers and the polyolefin heat-sensitive-adhesive fibers;

subjecting the resulting fiber web to a heat-fusing treatment and a hydro-entangling treatment to obtain a heat-fused and hydro-entangled nonwoven fabric, a sequence of the treatments being not specified; and then, imparting a hydrophilic property to the resultant heat-fused and hydro-entangled nonwoven fabric.

DESCRIPTION OF THE PREFERRED EMBODIMENTS

The polyolefin dividable composite fiber which may be used for the alkaline battery separator according to the present invention is composed of two or more polyolefin resin components which are orientated almost in parallel with a lengthwise direction of the composite fiber, in such a manner that the different resin components are brought into contact with each other. The polyolefin dividable composite fiber may be divided into fine fibers of different resin components by a treatment with a water jet or the like.

Figure 1:
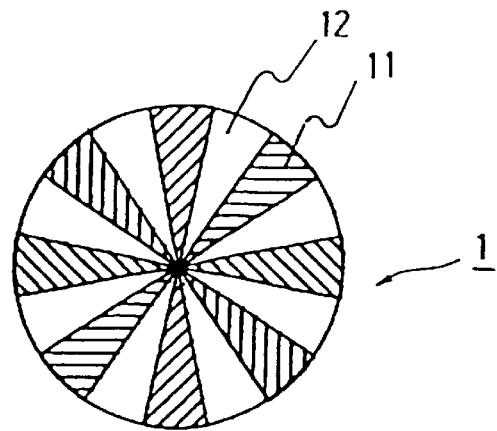
FIG. 1 is a sectional view schematically illustrating a polyolefin dividable composite fiber which may be used for the alkaline battery separator according to the present invention.
Figure 2:
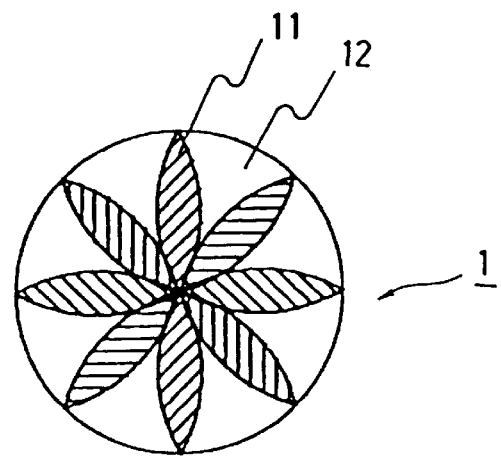
FIG. 2 is a sectional view schematically illustrating another polyolefin dividable composite fiber which may be used for the alkaline battery separator according to the present invention.
Figure 3:
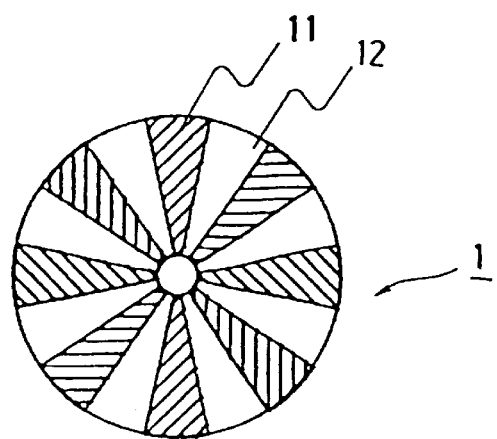
FIG. 3 is a sectional view schematically illustrating still another polyolefin dividable composite fiber which may be used for the alkaline battery separator according to the present invention.
Figure 4:
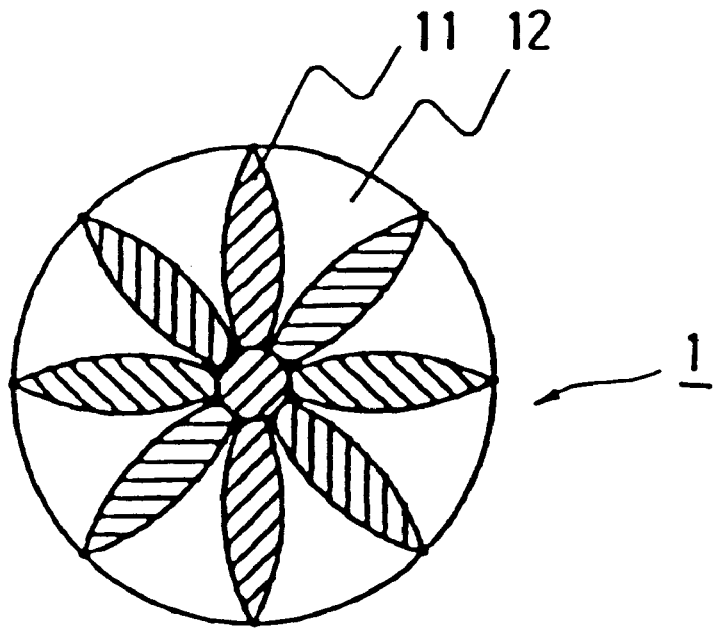
FIG. 4 is a sectional view schematically illustrating still another polyolefin dividable composite fiber which may be used for the alkaline battery separator according to the present invention.
Figure 5:
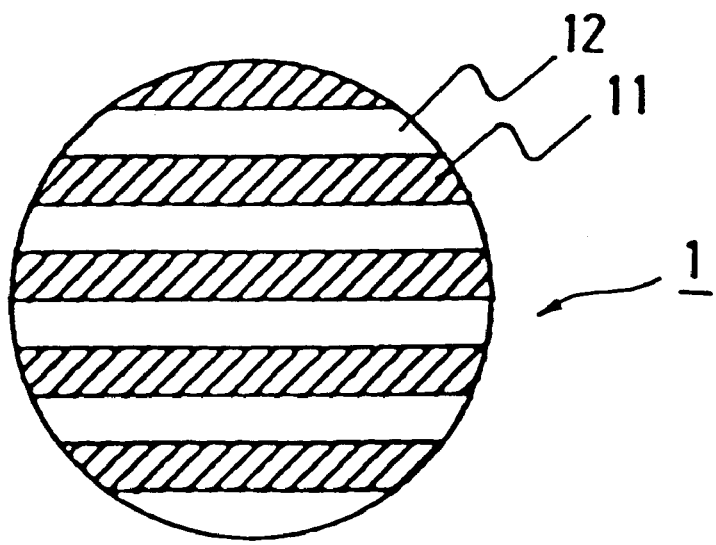
FIG. 5 is a sectional view schematically illustrating still another polyolefin dividable composite fiber which may be used for the alkaline battery separator according to the present invention.

The arrangement of the resin components in the polyolefin dividable composite fiber which may be used for the alkaline battery separator of the present invention is not limited. Examples of the arrangement of resin components will be described with reference to the drawings, when the polyolefin dividable composite fiber which may be used in the present invention is composed of two resin components. FIGS. 1 and 2 illustrate a polyolefin dividable composite fiber 1 which is composed of a polyolefin resin component 11 and a different polyolefin resin component 12 and has a cross-sectional structure wherein the components are divided by straight (FIG. 1) or curved (FIG. 2) lines radiating from the center portion; FIGS. 3 and 4 illustrate a polyolefin dividable composite fiber 1 which is composed of a polyolefin resin component 11 and a different polyolefin resin component 12 and has a cross-sectional structure wherein the components are divided by straight (FIG. 3) or curved (FIG. 4) lines radiating from the center portion, and one of the polyolefin resin components 11 and 12 is located in the center portion; and FIG. 5 illustrate a polyolefin dividable composite fiber 1 having a cross-sectional structure wherein polyolefin resin components 11 and 12 are laminated. The polyolefin dividable composite fibers having the cross-sectional structures as shown in FIGS. 1 to 4 are preferable, because of a uniformity in the diameter of the fine fibers derived therefrom.

The polyolefin resin components of the polyolefin dividable composite fiber may be, for example, polyethylene, polypropylene, ethylene-propylene copolymer, ethylene-butene-propylene copolymer, or ethylene-vinyl alcohol copolymer. The polyolefin dividable composite fiber may contain two or more polyolefin resin components and one or more other resin components, particularly only two or more polyolefin resin components. The combination of the polyolefin resin components is not limited, but the combination of polyethylene and polypropylene is preferable, and the combination of high-density polyethylene and polypropylene is more preferable, because of an excellent resistance to alkalis and acids thus are provided. The polyolefin dividable composite fiber containing ethylene-vinyl alcohol copolymer as one of the polyolefin resin components can enhance electrolyte-holding capacity, adsorbability of oxygen in an overcharged state, and thus, performance with respect to an internal pressure of the battery. It is preferable to combine ethylene-vinyl alcohol copolymer, which enhances the internal pressure performance, with polypropylene having an excellent resistance to alkalis.

An average fiber length (prior to division) of the polyolefin dividable composite fiber which may be used for the alkaline battery of the present invention is 20 to 60 mm, preferably 25 to 45 mm. When the average fiber length is less than 20 mm, some fibers may be broken when a fiber web is formed, or fine fibers cannot always be sufficiently entangled, and thus a sufficient tensile strength cannot always be obtained. When the average fiber length is more than 60 mm, the formation of a uniform fiber web becomes difficult, or sometimes even the formation of a fiber web becomes difficult. The term "average fiber length" used herein with regard to the fibers, such as the polyolefin dividable composite fiber, means a mean value of fiber lengths of 100 fibers, such as 100 polyolefin dividable composite fibers, randomly sampled. The fiber length of the polyolefin dividable composite fiber is not changed after the division, and thus the average fiber length thereof is not changed after the division.

An average fiber diameter of the polyolefin dividable composite fiber which may be used for the alkaline battery of the present invention is not limited, but may be determined in accordance with the desired average fiber diameter of the fine fibers derived therefrom. The term "average fiber diameter" used herein with regard to the fibers, such as the fine fiber, means a mean value of fiber diameters of 100 fibers, such as 100 fine fibers, randomly sampled. The diameter of the fiber, such as the fine fiber, having a non-circular cross-sectional shape, means a diameter of a fiber having a circular cross-sectional shape with an area the same as the non-circular cross-sectional area thereof.

The average fiber diameter of the fine fiber is not limited, but is preferably 1 to 10 $\mu$m, more preferably 2 to 7 $\mu$m. When the average fiber diameter is less than 1 $\mu$m, division of the polyolefin dividable composite fiber may sometimes be insufficient. When the average fiber diameter is more than 10 $\mu$m, a sufficient electrolyte-holding capacity cannot always be obtained.

The content of the polyolefin dividable composite fibers which may be used for the alkaline battery of the present invention is not limited. The polyolefin dividable composite fibers may account for 30 to 60 mass %, preferably 35 to 55 mass %, more preferably 40 to 50 mass % with respect to a total mass of the polyolefin dividable composite fibers, the high-strength fibers and the polyolefin heat-sensitive-adhesive fibers. When the content is less than 30 mass %, a sufficient electrolyte-holding capacity cannot always be obtained. When the content is more than 60 mass %, the ratios of other fibers drop, and thus the tensile and the breaking strengths may be lowered. When the polyolefin dividable composite fiber containing ethylene-vinyl alcohol copolymer is used, such a polyolefin dividable composite fiber preferably accounts for 5 to 40 mass %, more preferably 5 to 35 mass %, most preferably 10 to 30 mass %, with respect to a total mass of the polyolefin dividable composite fibers, the high-strength fibers and the polyolefin heat-sensitive-adhesive fibers. When the content is more than 40 mass %, a resistance to alkalis may be lowered.

The high-strength fiber which may be used for the alkaline battery of the present invention is not limited, as long as the average fiber length is 30 to 60 mm, preferably 35 to 45 mm, and the fiber strength, i.e., the tensile strength of fiber, is 5 g/denier or more, preferably 7 g/denier or more, more preferably 9 g/denier or more. As the high-strength fiber, general-purpose synthetic fibers, such as polypropylene, polyethylene, or polyamide, may be used. Polypropylene may be preferably used, because of a long-term resistance to alkalis and acids, surface modifiability, fiber performance or the like. The fiber strength (the tensile strength of fiber) is measured in accordance with JIS (Japanese Industrial Standard) L1015, a testing method for man-made staple fibers.

When the average fiber length is less than 30 mm, fibers may be insufficiently entangled, and a sufficient break strength cannot always be obtained. When the average fiber length is more than 60 mm, a fiber web may be difficult to form.

When the fiber strength is less than 5 g/denier, a sufficient break strength cannot always be obtained.

An average fiber diameter of the high-strength fiber is not limited, but preferably 8 to 30 μm, more preferably 12 to 25 μm. When the average fiber diameter is less than 8 μm, a fiber web may be difficult to form. When the average fiber diameter is more than 30 μm, the number of the high-strength fibers is decreased, and therefore, the break strength may be lowered or the thickness may be difficult to adjust.

It is preferable to use an ultra-high-strength polyethylene fiber having the fiber strength of 25 g/denier or more, more preferably 30 g/denier or more, as the high-strength fiber, because such an ultra-high-strength polyethylene fiber has also an excellent elasticity, and therefore, the separator may effectively avoid breakages caused by a tension applied during the assembly of the battery, a short circuit caused between electrodes via an electrode flash which breaks through the separator from one electrode to another electrode, or tearing by an electrode edge.

In the alkaline battery separator of the present invention, the high-strength fiber is used in an amount of 20 to 45 mass %, preferably 25 to 40 mass %, more preferably 30 to 40 mass %, with respect to the total mass of the polyolefin dividable composite fibers, the high-strength fibers and the polyolefin heat-sensitive-adhesive fibers. The tensile strength of the alkaline battery separator of the present invention varies mainly with the entangled condition of fine fibers derived from the polyolefin dividable composite fibers and the fused condition of the polyolefin heat-sensitive-adhesive fibers. When the amount of the high-strength fibers is more than 45 mass %, a sufficient tensile strength cannot always be obtained. When the amount of the high-strength fibers is less than 20 mass %, the ratio of high-strength fibers drop, and a sufficient break strength cannot always be obtained.

The amount of the ultra-high-strength polyethylene fiber having a fiber strength of 25 g/denier or more which is used as the high-strength fiber is preferably 1 to 45 mass %, more preferably 5 to 40 mass %, with respect to the total mass of the polyolefin dividable composite fibers, the high-strength fibers and the polyolefin heat-sensitive-adhesive fibers.

The polyolefin heat-sensitive-adhesive fiber which may be used in the alkaline battery separator of the present invention contains a polyolefin adhesive portion which has a melting point lower than a melting point of the polyolefin dividable composite fiber and lower than a melting point of the high-strength fiber. As the polyolefin adhesive portion, there may be used, for example, polyethylene, polypropylene, ethylene-propylene copolymer, or ethylene-butene-propylene copolymer. Low density polyethylene is preferable, because it has a low melting point and does not affect other fibers.

The polyolefin heat-sensitive-adhesive fiber may be a wholly fusible fiber which consists essentially of a polyolefin adhesive component, or a partially fusible fiber which contains two or more resin components and carries a polyolefin adhesive component on a fiber surface. As the wholly fusible fiber, there may be mentioned, for example, polyethylene or polypropylene fibers. As the partially fusible fiber, there may be mentioned, for example, a core/sheath type, side-by-side type, or eccentric type composite fiber.

The average fiber length of the polyolefin heat-sensitive-adhesive fiber which may be used in the alkaline battery separator of the present invention is 30 to 60 mm, preferably 35 to 50 mm. When the average fiber length is less than 30 mm, or more than 60 mm, the formation of a fiber web may become difficult.

The average fiber diameter of the polyolefin heat-sensitive-adhesive fiber which may be used in the alkaline battery separator of the present invention is not particularly limited but is preferably 12 to 25 μm, more preferably 15 to 21 μm. When the average fiber diameter is less than 12 μm, the formation of a fiber web may become difficult. When the average fiber diameter is more than 25 μm, the number of heat-sensitive-adhesive fibers is decreased, and the number of fused sites is decreased, and thus the tensile strength sometimes is lowered.

The content of the polyolefin heat-sensitive-adhesive fibers which may be used for the alkaline battery of the present invention is not limited. The polyolefin heat-sensitive-adhesive fibers may account for 10 to 40 mass %, preferably 15 to 35 mass %, more preferably 20 to 30 mass % with respect to a total mass of the polyolefin dividable composite fibers, the high-strength fibers and the polyolefin heat-sensitive-adhesive fibers. When the content is less than 10 mass %, the tensile strength is sometimes lowered. When the content is more than 40 mass %, the ratios of the other fibers drop, and thus the electrolyte-holding capacity or break strength may sometimes be lowered.

The alkaline battery of the present invention is composed of a hydrophilic nonwoven fabric which may be produced, for example, by the following process.

The polyolefin dividable composite fibers, the high-strength fibers and the polyolefin heat-sensitive-adhesive fibers are substantially uniformly mixed to form a fiber web; the resulting fiber web is subjected to heat-fusion and hydro-entangling treatments in any sequence, to obtain a heat-fused and hydro-entangled nonwoven fabric; and a hydrophilic property is imparted to the resulting heat-fused and hydro-entangled nonwoven fabric to obtain the hydrophilic nonwoven fabric.

The fiber web may be formed, preferably by a dry-laid method. The dry-laid method may be a conventional method such as a carding or air-laid method. The constitutional fibers may be uniformly mixed by the dry-laid method. In the dry-laid method, longer fibers may be used as the constitutional fibers and therefore an excellent entanglement may be achieved and a high tensile strength obtained.

In the step of forming the fiber web, it is preferable to prevent the polyolefin dividable composite fibers from dividing, and to prevent the polyolefin heat-sensitive-adhesive fibers from fusing. In general, however, it is very difficult to uniformly card the polyolefin dividable composite fibers, the high-strength fibers and the polyolefin heat-sensitive-adhesive fibers used in the present invention, in the dry-laid method. For example, if the polyolefin dividable composite fibers, particularly the polyolefin dividable composite fibers capable of producing fine fibers having a diameter of 1 to 10 μm, are simply carded in the dry-laid method, the fibers are divided and entangled to sometimes result in obtaining only a fiber web having an unsatisfactory texture or figure. Further, if the polyolefin heat-sensitive-adhesive fibers are simply carded in the dry-laid method, the fibers are fused by frictional heat and pressure to sometimes result in obtaining only a fiber web having an unsatisfactory texture or figure. The high-strength fibers have a high strength and a high stiffness. Therefore, if the high-strength fibers are simply carded in the dry-laid method, fiber lumps are liable to be produced to sometimes result in obtaining only a fiber web having an unsatisfactory texture or figure.

In the preferable embodiment of the process of the present invention, the carding of the fibers is carried out after adding a lubricating oil to the fibers, and a fiber web having an excellent texture or figure can be formed in the dry-laid method. The amount of lubricating oil added is preferably 0.5 to 3 mass %, more preferably 0.6 to 2 mass %, with respect to a total mass of the fibers. When the amount of lubricating oil added is less than 0.5 mass %, a sufficient enhancement of the carding workability cannot always be obtained. When the amount of lubricating oil added is more than 3 mass %, it sometimes becomes difficult to obtain a fiber web. The lubricating oil which may be used in the present invention is not limited, as long as it can achieve the desired purpose, but preferably an anionic lubricating oil, such as polyethylene glycol ester of a higher aliphatic acid, is used.

Then the resulting fiber web may be optionally pre-fused as a part of the fusing step, or as a pre-treatment independently of the fusing step. The resulting fiber web, without or with pre-fusion, is hydro-entangled, whereby the polyolefin dividable composite fibers are divided into fine fibers composed of each resin component, and at the same time, the polyolefin dividable composite fibers and/or the fine fibers derived therefrom are entangled with the high-strength fibers and the polyolefin heat-sensitive-adhesive fibers to obtain a hydro-entangled nonwoven fabric or a pre-fused and hydro-entangled nonwoven fabric. When the fiber web is pre-fused before hydro-entangling, the fibers in the fiber web are tentatively fused to each other, and therefore, the movement of the polyolefin dividable composite fibers is more or less limited and the polyolefin dividable composite fibers can be easily divided.

The hydro-entangling conditions are not particularly limited, but the hydro-entangling may be carried out under conventional conditions. For example, a nozzle plate containing one or more lines of nozzles having a diameter of 0.05 to 0.3 mm and a pitch of 0.2 to 3 mm may be used with a water jet under a pressure of 1 to 30 MPa. The hydro-entangling treatment may be carried out once, twice, or more times, if necessary, to one side or both sides of the web. If the fiber web is hydro-entangled on a support, such as a net or a perforated panel containing large pores, the resulting hydro-entangled nonwoven fabric also has large pores. The alkaline battery containing such a nonwoven fabric is liable to cause a short circuit. Therefore, it is preferable to uses a square-weave or plain weave fabric net having fine pores (for example, 50 mesh or more), or a perforated panel having a pore-to-pore distance of 0.4 mm or less.

The heat-fusing can be carried out by heating the fiber web or the hydro-entangled nonwoven fabric at a temperature which is higher than a melting point of the polyolefin adhesive portion in the polyolefin heat-sensitive-adhesive fibers, but lower than a melting point of the polyolefin dividable composite fiber, and lower than a melting point of the high-strength fiber. The heat-fusing can be carried out once, or more times, if necessary. When the heat-fusing is carried out two or more times, each treatment may be conducted under the same conditions, or partially or wholly different conditions. When the heat-fusing is carried out two or more times, a first fusing step corresponds to, or two or more steps with a first fusing step but without a final fusing step correspond to, the pre-fusing treatment. When the high-strength fiber used contains the ultra-high-strength polyethylene fiber, the heat-fusing is preferably carried out at a temperature below a softening point of the ultra-high-strength polyethylene fiber, for example below 125° C.

The sequence of the heat-fusing treatment and the hydro-entangling treatment is not specified. The heat-fused and hydro-entangled nonwoven fabric can be obtained by carrying out one treatment, and subsequently the other treatment, or one treatment and then the other treatment, and thereafter, the first treatment under the same conditions or partially or wholly different conditions. For example, it is preferable to carry out the first pre-fusing treatment, then the hydro-entangling treatment, and thereafter the heat-fusing treatment, because the polyolefin dividable composite fibers in the pre-fused web can be then easily divided, and the tensile strength and stiffness can be enhanced in the second fusing treatment.

The resulting heat-fused and hydro-entangled nonwoven fabric is fused with the polyolefin heat-sensitive-adhesive fibers, and thus has a high tensile strength and stiffness.

The hydrophilic nonwoven fabric which may be used as the alkaline battery separator according to the present invention can be obtained by imparting a hydrophilic property to the heat-fused and hydro-entangled nonwoven fabric. The treatment used for imparting a hydrophilic property may be a sulfonating treatment, a treatment with fluorine gas, a graft polymerization treatment with vinyl monomers, a treatment with a surface-active agent, a treatment used to adhere hydrophilic resins, a discharging treatment, or the like.

The sulfonating treatment contains, for example, but is not limited to, a treatment with fuming sulfuric acid, sulfuric acid, sulfur trioxide, chlorosulfuric acid, sulfuryl chloride, or the like. Of these treatments, the sulfonating treatment with fuming sulfuric acid is preferable, because of a high reactivity and an easier sulfonation obtained.

The treatment with fluorine gas contains, for example, but is not limited to, a treatment with a gas mixture of fluorine gas diluted with an inactive gas (such as nitrogen or argon gas) and at least one gas selected from a group consisting of oxygen, carbon dioxide and sulfur dioxide gases. The hydrophilic property can be effectively and permanently imparted by adsorbing sulfur dioxide gas to the heat-fused and hydro-entangled nonwoven fabric, and then bringing the fabric into contact with fluorine gas.

Examples of the vinyl monomer which may be used in the graft polymerization treatment are acrylic acid, methacrylic acid, acrylate, methacrylate, vinyl pyridine, vinyl pyrrolidone, styrene, or the like. When styrene is grafted, it is preferable to further carry out the sulfonation treatment to impart an affinity to the electrolyte. Acrylic acid has a good affinity with an electrode and may be preferably used.

The vinyl monomers can be polymerized, for example, by dipping the heat-fused and hydro-entangled nonwoven fabric in a solution containing the vinyl monomers and an initiator, and heating; by coating vinyl monomers on the heat-fused and hydro-entangled nonwoven fabric and applying radiation; by applying radiation to the heat-fused and hydro-entangled nonwoven fabric and then bringing the fabric into contact with the vinyl monomers; by impregnating the heat-fused and hydro-entangled nonwoven fabric with a solution containing vinyl monomers and a sensitizing agent, and applying ultraviolet rays. The graft polymerization can be effectively carried out by treating the surface of the heat-fused and hydro-entangled nonwoven fabric with ultraviolet radiation, a corona discharge or a plasma discharge before bringing the nonwoven fabric into contact with the vinyl monomer solution, to enhance the affinity with the vinyl monomer solution and easily generate radicals through polar hydrophilic groups produced in the pre-treatment. The graft polymerization treatment with vinyl monomers can be carried out under mild conditions in comparison with the sulfonation treatment, and the treatment per se has very little affect on the fiber strength, and therefore, is preferable in view of the fiber strength.

The treatment with a surface-active agent may be carried out by applying, for example, spraying or coating, a solution of an anionic surface-active agent (such as an alkali metal salt of a higher fatty acid, alkyl sulfonate, or a salt of sulfosuccinate) or a nonionic surface-active agent (such as polyoxyethylene alkyl ether, or polyoxyethylene alkylphenol ether) to the heat-fused and hydro-entangled nonwoven fabric, or dipping the nonwoven fabric in the solution.

The treatment by which a hydrophilic property is imparted can be carried out by adhering hydrophilic resins, such as carboxymethyl cellulose, polyvinyl alcohol, or polyacrylic acid, to the heat-fused and hydro-entangled nonwoven fabric. The hydrophilic resins may be adhered to the nonwoven fabric by spraying or coating a solution or dispersion of the hydrophilic resins in an appropriate solvent or dispersant, or dipping the nonwoven fabric in the solution or dispersion, and then drying.

Further, the treatment by which a hydrophilic property is imparted can be conducted by adhering cross-linked polyvinyl alcohols to the nonwoven fabric. The cross-linked polyvinyl alcohol can be formed, for example, by cross-linking a photosensitive polyvinyl alcohol substituted by a photosensitive group at a part of hydroxy groups of the formula:

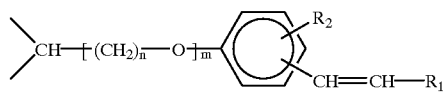

wherein $R_1$ represents a quaternized nitrogen-containing aromatic heterocyclic group, $R_2$ represents a hydrogen atom or alkoxyl group, m is 0 or 1, and n is an integer of 1 to 6, or an acylated derivative thereof prepared by acylating a part of hydroxyl groups of the photosensitive polyvinyl alcohol.

Partial structures of photosensitive polyvinyl alcohols, such as those substituted by a photosensitive group, are as follows:

(1) Photosensitive polyvinyl alcohols having a photosensitive styryl pyridinium group:

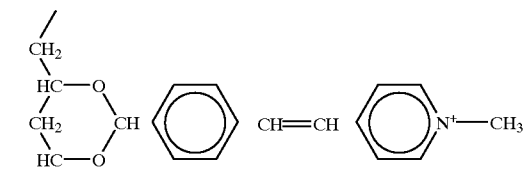

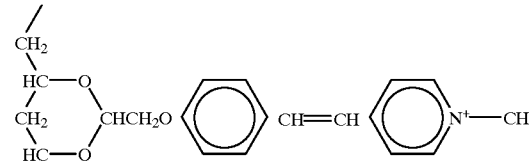

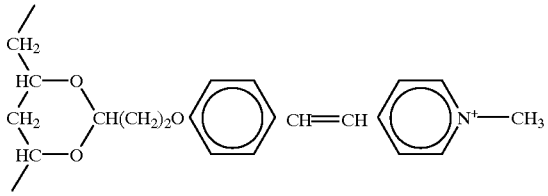

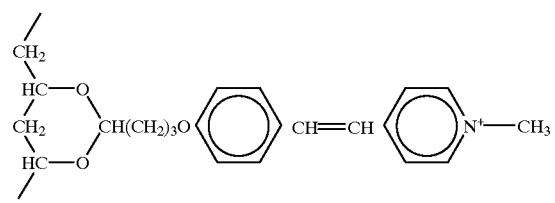

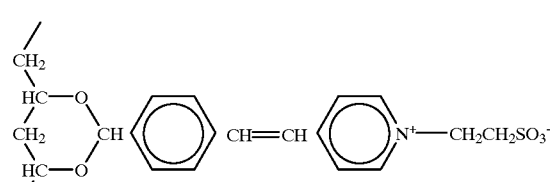

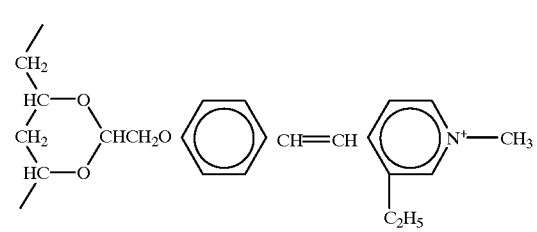

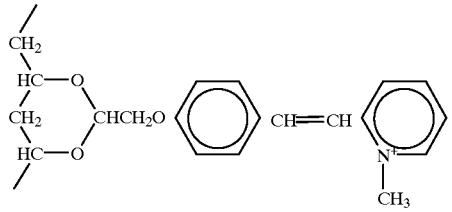

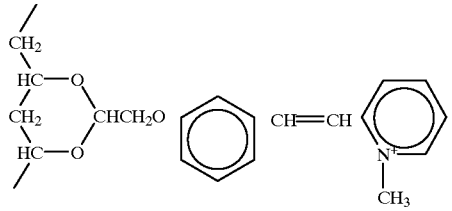

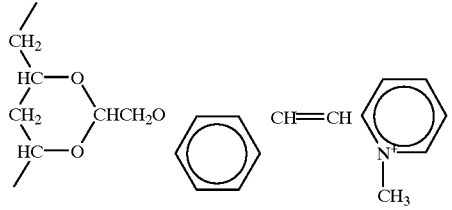

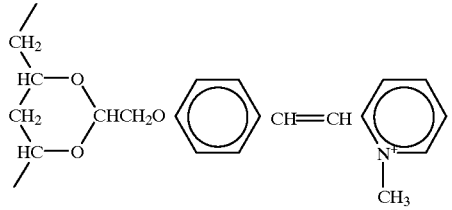

(2) Photosensitive polyvinyl alcohols having a photosensitive styryl quinolinium group:

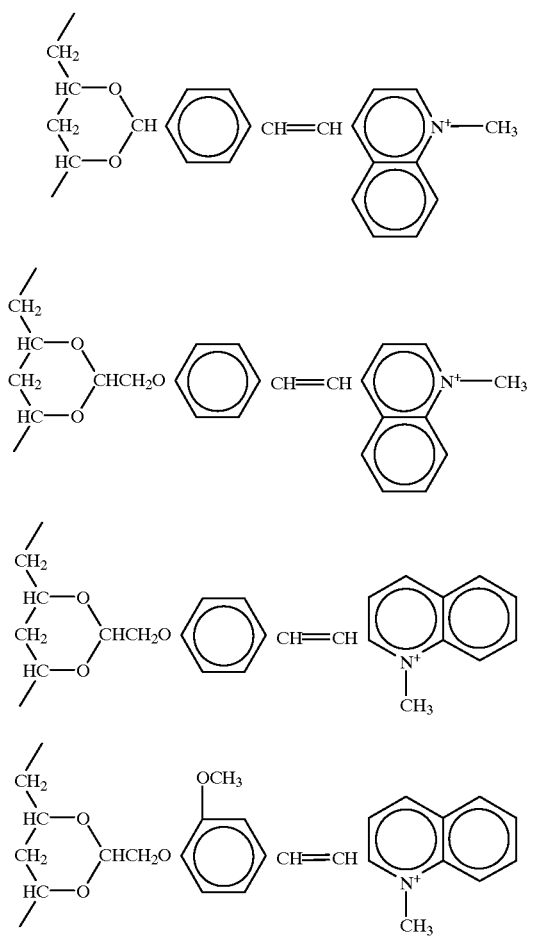

(3) Photosensitive polyvinyl alcohols having a photosensitive styryl benzothiazolinium group:

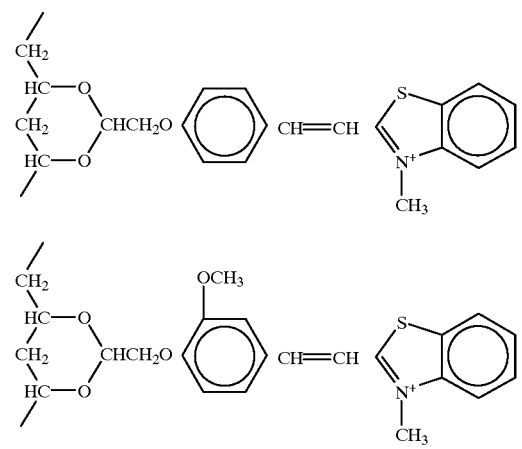

The photosensitive acylated polyvinyl alcohol is, for example, a photosensitive acylated polyvinyl alcohol having a photosensitive styryl pyridinium group, a partial structure of which is as follows:

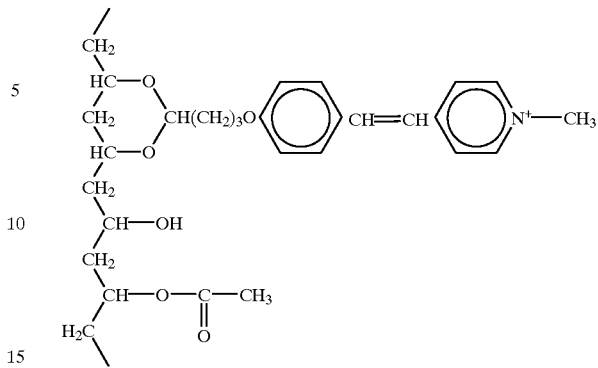

The cross-linked polyvinyl alcohols can be adhered to the heat-fused and hydro-entangled nonwoven fabric, for example, by (1) dissolving or dispersing the cross-linking photosensitive polyvinyl alcohols or the cross-linking photosensitive acylated polyvinyl alcohols, (2) dipping the nonwoven fabric in the resulting solution or dispersion, or spraying or coating the resulting solution or dispersion on the nonwoven fabric, (3) drying the solution or dispersion on the nonwoven fabric, and (4) radiating with light to cause a cross-linking reaction.

The cross-linking reaction of the photosensitive polyvinyl alcohols proceeds, for example, as shown in the following schema:

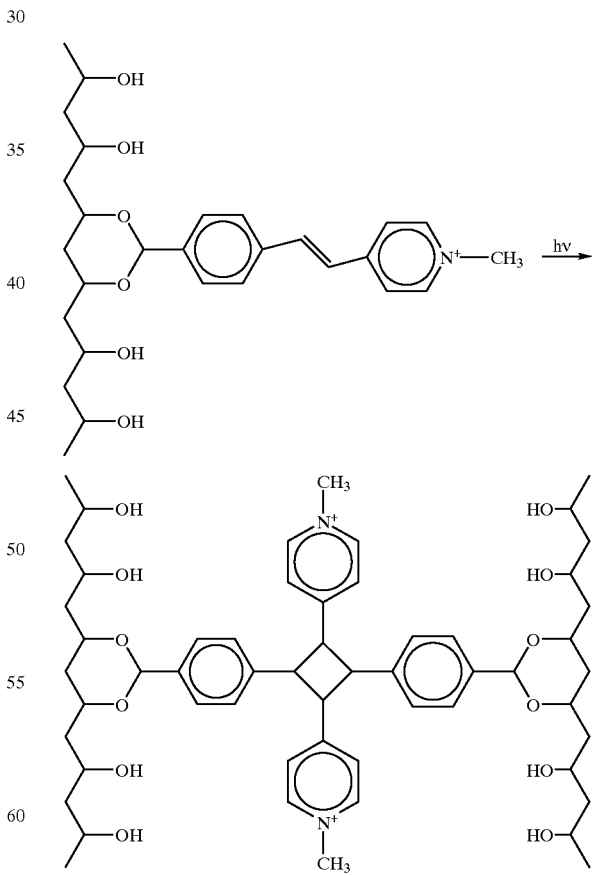

Of the above hydrophilic resins, cross-linked polyvinyl alcohols formed by cross-linking the photosensitive polyvinyl alcohols or photosensitive acylated polyvinyl alcohols having a photosensitive group, such as styryl pyridinium, styryl quinolinium or styryl benzthiazolinium group may be preferably used. This is not only because they have an excellent resistance to alkalis, but also because they contain functional groups, i.e., hydroxyl groups, which can form a chelate with an ion, and thus the functional groups can form chelates with ions before the ions deposit on electrodes in the form of branches, during charging and/or discharging, to thereby effectively prevent a short circuit between the electrodes. The amount of hydrophilic resins adhered is preferably 0.3 to 1 mass % with respect to the mass of the separator, so as not to affect the air-permeability.

As the discharging treatment, there may be mentioned, for example, treatments with a corona discharge, plasma discharge, glow discharge, surface discharge, or electron rays.

The density per unit area of the separator of the present invention is preferably 30 to 100 $g/m^2$, more preferably 40 to 80 $g/m^2$. When the density per unit area is less than 30 $g/m^2$, a sufficient tensile strength may not be obtained. When the density per unit area is more than 100 $g/m^2$, it may become difficult to obtain a battery with a high capacity.

The alkaline battery separator of the present invention has a tensile strength, electrolyte-holding capacity and break strength sufficient to enable the assembly of a battery, and therefore may be used as a separator for an alkaline primary or secondary battery. As the alkaline primary battery, there may be mentioned, for example, an alkaline-manganese battery, a mercury battery, a silver oxide battery, an air battery, or the like. As the alkaline secondary battery, there may be mentioned, for example, a nickel-cadmium battery, silver-zinc battery, silver-cadmium battery, nickel-zinc battery, nickel-hydrogen battery or the like.

Examples

The present invention will now be further illustrated by, but is by no means limited to, the following Examples.

Example 1

Dividable composite fibers (linear density=0.14 mg/m; fiber length=38 mm) which have a cross-sectional structure, as shown in FIG. 3, wherein polypropylene components capable of producing fine fibers having a fiber diameter of 4.3 $\mu$m, and high-density polyethylene components capable of producing fine fibers having a diameter of 4.2 $\mu$m, radiate from the center portion, and are divided into 8 portions, respectively, and a circular polypropylene component capable of producing a fine fiber having a diameter of 2.5 $\mu$m is located in the center portion; eccentric heat-sensitive-adhesive composite fibers (linear density=0.22 mg/m; fiber length=45 mm; fiber diameter=17.6 $\mu$m) composed of a core component of polypropylene and a sheath component of low-density polyethylene; and high-strength polypropylene fibers (linear density=0.17 mg/m; fiber length=45 mm; fiber diameter=15.3 $\mu$m) having a fiber strength of 5 g/denier were mixed at a mass ratio of 60:20:20, and 1.5 mass % (with respect to the total mass of mixed fibers) of a lubricating oil of polyethylene glycol ester of a higher aliphatic acid was added to the fibers. Then, the fibers were carded by a carding machine to form a parallel-laid fiber web. The resulting fiber web was heated at 128° C. to pre-fuse only the low-density polyethylene of the eccentric heat-sensitive-adhesive composite fibers. The pre-fused web was mounted on a square-weave net of 80 mesh, and hydro-entangled with a water jet having a hydraulic pressure of 9.8 MPa, using a nozzle plate having a nozzle diameter of 0.13 mm and a pitch of 0.6 mm, twice each side for both sides. Thereafter, the web was heated at 130° C., to fuse only the low-density polyethylene of the eccentric heat-sensitive-adhesive composite fibers and thereby obtain a heat-fused and hydro-entangled nonwoven fabric. The resulting heat-fused and hydro-entangled nonwoven fabric was calendered under a linear pressure of 9.8 N/cm, and then treated with fluorine gas, using a gas mixture of fluorine, oxygen and sulfur dioxide gases, to obtain an alkaline battery separator (area density=60 $g/m^2$; thickness= 0.15 mm) of the present invention.

Example 2

The procedure disclosed in Example 1 was repeated, except that a mass ratio of the dividable composite fibers, eccentric heat-sensitive-adhesive composite fibers and high-strength polypropylene fibers was 50:20:30, to obtain an alkaline battery separator (area density=60 $g/m^2$; thickness= 0.15 mm) of the present invention.

Example 3

The procedure disclosed in Example 1 was repeated, except that a mass ratio of the dividable composite fibers, eccentric heat-sensitive-adhesive composite fibers and high-strength polypropylene fibers was 40:20:40, to obtain an alkaline battery separator (area density=60 $g/m^2$; thickness= 0.15 mm) of the present invention.

Example 4

The procedure disclosed in Example 1 was repeated, except that a mass ratio of the dividable composite fibers, eccentric heat-sensitive-adhesive composite fibers and high-strength polypropylene fibers was 40:25:35, to obtain an alkaline battery separator (area density=60 $g/m^2$; thickness= 0.15 mm) of the present invention.

Example 5

The procedure disclosed in Example 4 was repeated, except that polypropylene fibers having a fiber strength of 9 g/denier, a linear density of 0.22 mg/m, a fiber length of 45 mm, and a fiber diameter of 17.7 $\mu$m were used as the high-strength fibers to obtain an alkaline battery separator (area density=60 $g/m^2$; thickness=0.15 mm) of the present invention.

Example 6

The procedure disclosed in Example 1 was repeated, except that polypropylene fibers having a fiber strength of 9 g/denier, a linear density of 0.22 mg/m, a fiber length of 45 mm, and a fiber diameter of 17.7 $\mu$m were used as the high-strength fibers to obtain an alkaline battery separator (area density=60 $g/m^2$; thickness=0.15 mm) of the present invention.

Example 7

The procedure disclosed in Example 2 was repeated, except that polypropylene fibers having a fiber strength of 9 g/denier, a linear density of 0.22 mg/m, a fiber length of 45 mm, and a fiber diameter of 17.7 $\mu$m were used as the high-strength fibers to obtain an alkaline battery separator (area density=60 $g/m^2$; thickness=0.15 mm) of the present invention.

Example 8

The procedure disclosed in Example 3 was repeated, except that polypropylene fibers having a fiber strength of 9 g/denier, a linear density of 0.22 mg/m, a fiber length of 45 mm, and a fiber diameter of 17.7 µm were used as the high-strength fibers to obtain an alkaline battery separator (area density=60 g/m$^2$; thickness=0.15 mm) of the present invention.

Example 9

Dividable composite fibers (linear density=0.33 mg/m; fiber length=38 mm) which have a cross-sectional structure, as shown in FIG. 1, wherein ethylene-vinyl alcohol copolymer components capable of producing fine fibers having a fiber diameter of 4.8 µm, and polypropylene components capable of producing fine fibers having a diameter of 5.4 µm radiate from the center portion, and are divided into 8 portions, respectively [at an amount of 20 mass %]; dividable composite fibers the same as those used in Example 1 except for a fiber length of 25 mm [at an amount of 20 mass %]; eccentric heat-sensitive-adhesive composite fibers the same as those used in Example 1 except for fiber length of 38 mm [at an amount of 25 mass %]; and high-strength polypropylene fibers (linear density=0.22 mg/m; fiber length=45 mm; fiber diameter=17.7 µm) having a fiber strength of 9 g/denier [at an amount of 35 mass %] were mixed, and 1.5 mass % (with respect to the total mass of mixed fibers) of a lubricating oil of polyethylene glycol ester of a higher aliphatic acid was added to the fibers. Then, the fibers were carded by a carding machine to form a parallel-laid fiber web. The resulting fiber web was heated at 125° C. to pre-fuse only the low-density polyethylene of the eccentric heat-sensitive-adhesive composite fibers.

Then, a hydro-entangled fiber web was formed in accordance with the procedure disclosed in Example 1, except that a water jet having a hydraulic pressure of 12.7 MPa was used. Thereafter, the web was heated at 125° C. to fuse only the low-density polyethylene of the eccentric heat-sensitive-adhesive composite fibers, to thereby obtain a heat-fused and hydro-entangled nonwoven fabric. The resulting heat-fused and hydro-entangled nonwoven fabric was calendered under a linear pressure of 9.8 N/cm, and then treated with fluorine gas, using a gas mixture of fluorine, oxygen and sulfur dioxide gases, to obtain an alkaline battery separator (area density=60 g/m$^2$; thickness=0.15 mm) of the present invention.

Example 10

Dividable composite fibers the same as those used in Example 1 except for a fiber length of 25 mm [at an amount of 40 mass %]; eccentric heat-sensitive-adhesive composite fibers the same as those used in Example 1 except for a fiber length of 38 mm [at an amount of 25 mass %]; high-strength polypropylene fibers (fiber strength=9 g/denier; linear density=0.22 mg/m; fiber length=45 mm; fiber diameter= 17.7 µm) [at an amount of 25 mass %]; and ultra-high-strength polyethylene fibers (fiber strength=33 g/denier; linear density=0.11 mg/m; fiber length=38 mm; fiber diameter=12.1 µm) [at an amount of 10 mass %] were mixed, and 1.5 mass % (with respect to the total mass of mixed fibers) of a lubricating oil of polyethylene glycol ester of a higher aliphatic acid was added to the fibers. Then, the fibers were carded by a carding machine to form a parallel-laid fiber web.

The resulting fiber web was heated at 115° C. to pre-fuse only the low-density polyethylene of the eccentric heat-sensitive-adhesive composite fibers.

Then, a hydro-entangled fiber web was formed in accordance with the procedure disclosed in Example 1, except that a water jet having a hydraulic pressure of 12.7 MPa was used. Thereafter, the web was heated at 115° C. to fuse only the low-density polyethylene of the eccentric heat-sensitive-adhesive composite fibers, to thereby obtain a heat-fused and hydro-entangled nonwoven fabric. The resulting heat-fused and hydro-entangled nonwoven fabric was calendered under a linear pressure of 9.8 N/cm, and then treated with fluorine gas, using a gas mixture of fluorine, oxygen and sulfur dioxide gases, to obtain an alkaline battery separator (area density=60 g/m$^2$; thickness=0.15 mm) of the present invention.

Comparative Example 1

The procedure disclosed in Example 1 was repeated, except that the dividable composite fibers used in Example 1 and the eccentric heat-sensitive-adhesive composite fibers used in Example 1 were mixed at a mass ratio of 80:20, instead of mixing the dividable composite fibers, eccentric heat-sensitive-adhesive composite fibers and high-strength polypropylene fibers, to obtain an alkaline battery separator (area density=60 g/m$^2$; thickness=0.15 mm).

Comparative Example 2

The procedure disclosed in Example 1 was repeated, except that a mass ratio of the dividable composite fibers, eccentric heat-sensitive-adhesive composite fibers and high-strength polypropylene fibers was 70:20:10, to obtain an alkaline battery separator (area density=60 g/m$^2$; thickness= 0.15 mm).

Comparative Example 3

The procedure disclosed in Example 1 was repeated, except that a mass ratio of the dividable composite fibers, eccentric heat-sensitive-adhesive composite fibers and high-strength polypropylene fibers was 30:20:50, to obtain an alkaline battery separator (area density=60 g/m$^2$; thickness= 0.15 mm).

Comparative Example 4

The procedure disclosed in Example 2 was repeated, except that 30 mass % of polypropylene fibers having a fiber strength of 4 g/denier was used instead of high-strength polypropylene fibers having a fiber strength of 5 g/denier, to obtain an alkaline battery separator (area density=60 g/m$^2$; thickness=0.15 mm).

Comparative Example 5

The procedure disclosed in Example 4 was repeated, except that polypropylene fibers (fiber strength=4 g/denier; linear density=0.22 mg/m; fiber length=45 mm; fiber diameter=17.7 µm) were used instead of high-strength polypropylene fibers having a fiber strength of 5 g/denier, to obtain an alkaline battery separator (area density=60 g/m$^2$; thickness=0.15 mm).

Comparative Example 6

A fiber web was formed by a wet-laid method from a slurry containing 45 mass % of dividable fibers, capable of producing ethylene-vinyl alcohol copolymer fine fibers, of which the dividable fibers are the same as those used in Example 9 except for a fiber length of 6 mm; 30 mass % of high-strength fibers the same as those used in Example 5 except for a fiber length of 10 mm; and 25 mass % of eccentric heat-sensitive-adhesive composite fibers the same as those used in Example 1 except for a fiber length of 10 mm. Thereafter, a heating treatment, a dividing-entangling treatment, a heating treatment, a calendering treatment, and a fluorine gas treatment were carried out by repeating the procedure disclosed in Example 9, to obtain an alkaline battery separator (area density=60 g/m$^2$; thickness=0.15 mm).

Evaluation of Properties (1) Capacity for holding electrolyte under pressure

Each of the alkaline battery separators prepared in Examples 1 to 10 and comparative Examples 1 to 6 was cut into a disc having a diameter of 30 cm. The disc was placed at 20° C. under a relative humidity of 65% so that the moisture content was equilibrated. Thereafter, the mass ($m_0$) was measured. Then, the disc was dipped in an aqueous potassium hydroxide solution having a specific gravity of 1.3 (at 20° C.) for 1 hour, to replace air in the disc with the potassium hydroxide solution. The disc holding the potassium hydroxide solution was sandwiched between six filter papers having a diameter of 30 cm (three papers on each side) and a pressure of 5.7 MPa was applied for 30 seconds by a pressure pump. Then the mass ($m_1$) of the pressed disc was measured. The capacity (X; %) for holding electrolyte under pressure was calculated from the equation:

$$X=[(m_1-m_0)/m_0]\times 100$$

The average values obtained from four measurements for each alkaline battery separator were as shown in Table 1.

(2) Tensile strength

Each of the alkaline battery separators prepared in Examples 1 to 10 and comparative Examples 1 to 6 was cut into a belt having a width of 50 mm. The belt was set on a tensile tester (TENSILON UCT-500; trademark for a tester manufactured by ORIENTEC, Co.), and a tensile strength (unit=N/50 mm width) measured at a chuck-to-chuck distance of 100 mm and a pulling rate of 300 mm/m. The results were as shown in Table 1.

(3) Index of resistance to penetration

An index of resistance to penetration was measured by a handy-type compression tester (KES-G5; manufactured by KATO TECH Co., Ltd.). A laminate having a thickness of about 2 mm was formed from each of the alkaline battery separators prepared in Examples 1 to 10 and comparative Examples 1 to 6. A stainless steel jig (thickness=0.5 mm; angle of the blade edge=60°) was thrust perpendicularly into the laminate from the top layer at a rate of 0.01 cm/s, and the force required to cut the top layer was measured. The ratio of the force required to cut the top layer of each separator to the standard force (100) required to cut the top layer of the separator prepared in comparative Example 5 because the index (%) of resistance to penetration.

TABLE 1

|  | Proportions of fibers (mass %) | | | Properties as separator | | |
| --- | --- | --- | --- | --- | --- | --- |
|  | A | B | C | 1 | 2 | 3 |
| Example 1 | 60 | 20 | 20 | 18 | 294 | 111 |
| Example 2 | 50 | 20 | 30 | 15 | 274 | 120 |
| Example 3 | 40 | 20 | 40 | 13 | 245 | 129 |
| Example 4 | 40 | 25 | 35 | 13 | 240 | 125 |
| Example 5 | 40 | 25 | 35 | 13 | 248 | 154 |
| Example 6 | 60 | 20 | 20 | 18 | 298 | 135 |
| Example 7 | 50 | 20 | 30 | 15 | 280 | 150 |

TABLE 1-continued

|  | Proportions of fibers (mass %) | | | Properties as separator | | |
| --- | --- | --- | --- | --- | --- | --- |
|  | A | B | C | 1 | 2 | 3 |
| Example 8 | 40 | 20 | 40 | 13 | 246 | 168 |
| Example 9 | 40 | 25 | 35 | 15 | 256 | 155 |
| Example 10 | 40 | 25 | 35 (25 + 10) | 17 | 260 | 210 |
| Comparative Example 1 | 80 | 20 | 0 | 20 | 314 | 93 |
| Comparative Example 2 | 70 | 20 | 10 | 19 | 304 | 98 |
| Comparative Example 3 | 30 | 20 | 50 | 12 | 176 | 136 |
| Comparative Example 4 | 50 | 20 | 30 | 15 | 167 | 98 |
| Comparative Example 5 | 40 | 25 | 35 | 13 | 172 | 100(*) |
| Comparative Example 6 | 45 | 25 | 30 | 18 | 105 | 158 |

In Table 1, (A) denotes a mass percentage of the polyolefin dividable composite fibers in the whole constitutional fibers; (B) denotes a mass percentage of the eccentric heat-sensitive-adhesive composite fibers in the whole constitutional fibers; (C) denotes a mass percentage of the high-strength polypropylene fibers in the whole constitutional fibers [in Example 10, (C) denotes the sum (35 mass %) of 25 mass % of the high-strength polypropyrene fibers and 10 mass % of the ultra-high-strength polyethylene fibers]; (1) denotes a capacity for holding electrolyte under pressure; (2) denotes a tensile strength; and (3) denotes an index of resistance to penetration.

As above, the alkaline battery separators prepared in Examples 1 to 10 have a practical and sufficient capacity for holding electrolyte under pressure, and a required tensile strength. Further, they have an excellent index of resistance to penetration, i.e., break strength, and therefore, have a long life, exhibit a low fraction defective, and show a low variability of battery performance.

(4) Test for performance of internal pressure

As a current collector of electrodes, a paste nickel positive electrode (width=33 mm; length=182 mm) prepared from a foamed nickel base, and a paste hydrogen-occluded alloy negative electrode (mesh metal alloy; width=33 mm; length=247 mm) were formed. Each of the alkaline battery separator prepared in Examples 4 and 9 was cut into a separator sample (width=35 mm; length=410 mm). The separator sample was sandwiched between the positive and negative electrodes and rolled into a voluted form to obtain SC type electrodes. The electrodes were put into an outer container, 5N potassium hydroxide and 1N lithium hydroxide were poured in as electrolytes, and the container was sealed to obtain a cylindrical nickel-hydrogen battery.

Then, the battery was discharged at 0.5 C (coulomb) and 20° C., and the internal pressure of the battery at a volume of 150% was measured. In comparison with the internal pressure (100) of the battery prepared from the separator of Example 4, the internal pressure of the battery prepared from the separator of Example 9 was 70. This shows that the battery prepared from the separator of Example 9 does not suffer a leakage of an electrolyte when over-charged.

INDUSTRIAL APPLICABILITY

The alkaline battery separator of the present invention exhibits an excellent breaking strength. For example, when the alkaline battery separators are rolled together with electrodes plates upon assembling an alkaline battery, there is very little breakage of the separators by contact with edges of the electrode plates. Further, the alkaline battery separator of the present invention has practical and sufficient tensile strength and electrolyte-holding capacity properties.

Although the present invention has been described with reference to specific embodiments, various changes and modifications obvious to those skilled in the art are deemed to be within the spirit, scope, and concept of the invention.

What is claimed is:

1. An alkaline battery separator comprising a hydrophilic nonwoven fabric obtainable by substantially uniformly admixing (1) polyolefin dividable composite fibers having an average fiber length of 20 to 60 mm, said polyolefin dividable composite fibers being a combination of high-density polyethylene and polypropylene, (2) high-strength fibers having an average fiber length of 30 to 60 mm and a fiber strength of at least 7 g/denier, said high-strength fibers being polypropylene and/or ultra-high-strength polyethylene, and (3) polyolefin heat-sensitive-adhesive fibers having an average fiber length of 30 to 60 mm, said polyolefin heat-sensitive-adhesive fibers being composed of a core component of polypropylene and a sheath component of low-density polyethylene, to form a fiber web by a dry-laid method, subjecting the resulting fiber web to a heat-fusing treatment and a hydro-entangling treatment to obtain a heat-fused and hydro-entangled nonwoven fabric, and imparting a hydrophilic property to the resulting heat-fused and hydro-entangled nonwoven fabric; said high-strength fibers accounting for 25 to 40 mass % with respect to a total mass of said polyolefin dividable composite fibers, said high-strength fibers and said polyolefin heat-sensitive-adhesive fibers.

2. The alkaline battery separator according to claim 1, wherein an average fiber diameter of fine fibers divided from said polyolefin dividable composite fiber is 1 to 10 μm.

3. The alkaline battery separator according to claim 1, wherein said polyolefin dividable composite fibers account for 30 to 60 mass % with respect to a total mass of said polyolefin dividable composite fibers, said high-strength fibers and said polyolefin heat-sensitive-adhesive fibers.

4. The alkaline battery separator according to claim 1, wherein said high-strength fiber is polypropylene or ultra high-strength polyethylene fiber.

5. The alkaline battery separator according to claim 1, wherein said ultra-high-strength polyethylene fiber has a fiber strength of 25 g/denier or more.

6. The alkaline battery separator according to claim 1, wherein said polyolefin heat-sensitive-adhesive fibers account for 10 to 40 mass % with respect to a total mass of said polyolefin dividable composite fibers, said high-strength fibers and said polyolefin heat-sensitive-adhesive fibers.

7. The alkaline battery separator according to claim 1, wherein the high-strength fiber is polypropylene.

8. An alkaline battery containing the battery separator of claim 1.

9. The battery of claim 8 which is a nickel-hydrogen battery.

10. The battery of claim 8 which is a nickel-cadmium battery.

11. A process for producing an alkaline battery separator comprising the steps of:

substantially uniformly admixing (1) polyolefin dividable composite fibers having an average fiber length of 20 to 60 mm, said polyolefin dividable composite fibers being a combination of high-density polyethylene and polypropylene, (2) high-strength fibers having an average fiber length of 30 to 60 mm and a fiber strength of at least 7 g/denier, said high-strength fibers being polypropylene and/or ultra-high-strength polyethylene, and (3) polyolefin heat-sensitive-adhesive fibers having an average fiber length of 30 to 60 mm, said polyolefin heat-sensitive-adhesive fibers being composed of a core component of polypropylene and a sheath component of low-density polyethylene, to form a fiber web by a dry-laid method, said high-strength fibers accounting for 25 to 40 mass % with respect to a total mass of said polyolefin dividable composite fibers, said high-strength fibers and said polyolefin heat-sensitive-adhesive fibers;

subjecting the resulting fiber web to a heat-fusing treatment and a hydro-entangling treatment, to obtain a heat-fused and hydro-entangled nonwoven fabric; and then, imparting a hydrophilic property to the resulting heat-fused and hydro-entangled nonwoven fabric.

12. The process according to claim 11, wherein the high-strength fiber is polypropylene.

13. A process for producing an alkaline battery separator comprising steps of:

substantially uniformly admixing (1) polyolefin dividable composite fibers having an average fiber length of 20 to 60 mm, (2) high-strength fibers having an average fiber length of 30 to 60 mm and a fiber strength of 5 g/denier or more, and (3) polyolefin heat-sensitive-adhesive fibers having an average fiber length of 30 to 60 mm, said polyolefin heat-sensitive-adhesive fiber containing a polyolefin adhesive portion having a melting point lower that a melting point of said polyolefin dividable composite fiber and lower than a melting point of said high-strength fiber, then adding a lubricating oil thereto, and thereafter forming said fiber web by dry laid method, said high-strength fibers accounting for 20 to 45 mass % with respect to a total mass of said polyolefin dividable composite fibers, said high strength fibers and said polyolefin heat-sensitive-adhesive fibers; subjecting the resulting fiber web to a heat-fusing treatment and a hydro-entangling treatment, to obtain a heat-fused and hydro-entangled nonwoven fabric, and then, imparting a hydrophilic property to the resulting heat-fused and hydro-entangled nonwoven fabric.

14. The process according to claim 13, wherein said lubricating oil is added in an amount of 0.5 to 3 mass % with respect to a total mass of fibers.

15. The process according to claim 13, wherein said fiber web is heated to obtain a pre-fused web; the resulting pre-fused web is hydro-entangled; and then the resulting hydro-entangled web is fused.

* * * * *

UNITED STATES PATENT AND TRADEMARK OFFICE
CERTIFICATE OF CORRECTION

PATENT NO. : 6,183,913 B1
DATED : February 6, 2001
INVENTOR(S) : Masanao Tanaka et al.

It is certified that error appears in the above-identified patent and that said Letters Patent is hereby corrected as shown below:

Column 8,
Line 44, change "electrode" to -- electrolyte --.

Column 9,
Line 23, change "hydroxy" to -- hydroxyl --.

Column 17,
Line 49, change "The ratio of the force required to cut the top layer of each separator to the standard force (100) required to cut the top layer of the separator prepared in comparative Example 5 because the index (%) of resistance to penetration." to
-- The index (%) of resistance to penetration was the ratio of the force required to cut the top layer of each separator to the standard force (100) required to cut the top layer of the separator prepared in comparative Example 5. --.

Column 20,
Line 36, change "that" to -- than --.
Line 39, change "said" to -- a --.
Line 39, after "by" insert -- a --.

Signed and Sealed this

Sixteenth Day of August, 2005

JON W. DUDAS
*Director of the United States Patent and Trademark Office*